United States Patent [19]

Rozsa

[11] Patent Number: 4,507,595
[45] Date of Patent: Mar. 26, 1985

[54] DEVICE FOR CORRECTING OF BACKLASH IN DRIVE MECHANISMS COMPRISING A SCREW AND A NUT

[75] Inventor: Kalman Rozsa, Järfälla, Sweden

[73] Assignee: Facit Aktiebolag, Atvidaberg, Sweden

[21] Appl. No.: 504,051

[22] PCT Filed: Sep. 13, 1982

[86] PCT No.: PCT/SE82/00281
§ 371 Date: May 11, 1983
§ 102(e) Date: May 11, 1983

[87] PCT Pub. No.: WO83/01130
PCT Pub. Date: Mar. 31, 1983

[30] Foreign Application Priority Data

Sep. 18, 1981 [SE] Sweden ................ 8105543

[51] Int. Cl.³ .............................................. G05B 11/01
[52] U.S. Cl. ..................................... 318/630; 318/632; 318/663
[58] Field of Search ................ 318/630, 632, 663

[56] References Cited

U.S. PATENT DOCUMENTS

| 3,705,400 | 12/1972 | Cordes, Jr. ............... | 318/632 X |
| 3,708,736 | 1/1973 | Hoshina et al. ........... | 318/632 |
| 3,794,902 | 2/1974 | Nishimura et al. ........ | 318/632 X |
| 3,886,424 | 5/1975 | Hoshina et al. ........... | 318/630 |
| 4,296,365 | 10/1981 | Yoshikawa ................. | 318/632 |

Primary Examiner—B. Dobeck
Attorney, Agent, or Firm—Roberts, Spiecens & Cohen

[57] ABSTRACT

A drive mechanism comprising a power driven screw (16) and a nut means (17) co-operating with the screw includes a device for the correction of backlash prevailing between the screw and the nut means. The correction takes place electronically by modification of two pulse trains (A, B) which are generated by a pulse generator (19) which is synchronized with the movement of the screw. From the two pulse trains information as to position and direction of movement is derived for a movable unit (11), which is connected to the nut means and which, for instance, can be a printing unit in a printer or a typewriter. A measured or estimated value of the backlash is digitally stored with a resolution of one quarter of the period of the pulse trains. This resolution is four times the smallest distance through which the movable unit can be moved. The two pulse trains (A, B) are combined in a signal modifying device (21) in four different ways and in a selected one of two opposite successions used to perform displacement of a predetermined flank (8) in one (B) of the pulse trains as many steps of one quarter of the period as correspond to the stored backlash value and in a direction corresponding to the selected succession.

6 Claims, 8 Drawing Figures

DEVICE FOR CORRECTING OF BACKLASH IN DRIVE MECHANISMS COMPRISING A SCREW AND A NUT

BACKGROUND OF THE INVENTION

The present invention relates to a device for correcting of backlash, which arises on a change in the direction of movement in a drive mechanism and more particularly a power driven screw and a nut means cooperating with the screw, the nut means being connected to a unit which is movable back and forth along the screw. The device includes preferably a printing unit of a printer or a typewriter pulse generating means of the incremental type which in synchronism with the movement of the screw is arranged to generate two pulse trains having the same quadrangular shape but being 90° out of phase. The pulse trains have a period corresponding to the displacement of the movable unit a predetermined distance along the screw and are arranged to be applied to a means which utilizes the pulse trains determine the position and the direction of the movable unit.

It is known in printers in connection with screw drive mechanisms of the kind referred to above to provide an incremental code disc that rotates with the screw and co-operates with a photoelectric device, in the usual way comprising light-emitting diodes and phototransistors, to generate two pulse trains being 90° out of phase. From the two pulse trains information is derived about the position and the direction of movement of a printing unit movable back and forth along the screw.

In order for the movable unit to be easily moved along the screw a certain play or backlash must be present between the screw and a nut means co-operating with the screw. Usually, the backlash is compensated in a mechanical way, for example the nut means may comprise two nuts which are spring biassed away from each other and towards the flanks of the helical groove of the screw.

SUMMARY OF THE INVENTION

An object of the invention is without using mechanical arrangements, to correct for the play or backlash that necessarily must be present between the nut means and the screw. In accordance with the principle of the invention a measured or estimated value of the existing backlash is stored and used for the correction of control signals which are applied to an electric motor provided for driving of the screw. By this kind of correction the drive arrangement can be mechanically constructed such that the nut means will move along the screw with a minimum of friction at the same time as the backlash can be compensated at a higher degree than would be possible with mechanical arrangements. Correction must take place every time the movable unit changes its direction of movement. If in that connection the backlash is regularly measured the wear, appearing in the screw drive mechanism as time goes on and involving a gradual increase of the backlash, will be taken into consideration. Variations in magnitude of the backlash caused by wear cannot be equally corrected by mechanical correcting arrangements.

A further object of the invention is to achieve correction of the existing backlash in steps corresponding to a quarter of the period of the pulse trains utilized for determining of position and direction of movement.

The objects indicated will be achieved in a device having the characterizing features stated in the appending claims.

BRIEF DESCRIPTION OF THE DRAWING

An embodiment of the invention will now be described with reference to the accompanying drawings.

FIG. 1 schematically shows a printer 10 comprising a carriage 11, which supports a printing head 12. The carriage is supported by supporting shafts 13, 14 and is driven back and forth along the supporting shafts by a drive mechanism comprising a screw 16, driven by a motor 15, and a nut means 17 fixedly connected to the carriage 11. The printing head 12 co-operates with a platen 18, acting as an abutment, for applying characters onto a web, not shown, the web being fed in the space between the printing head and the platen in a direction perpendicular to the direction of the supporting shafts 13, 14.

Figure 1:
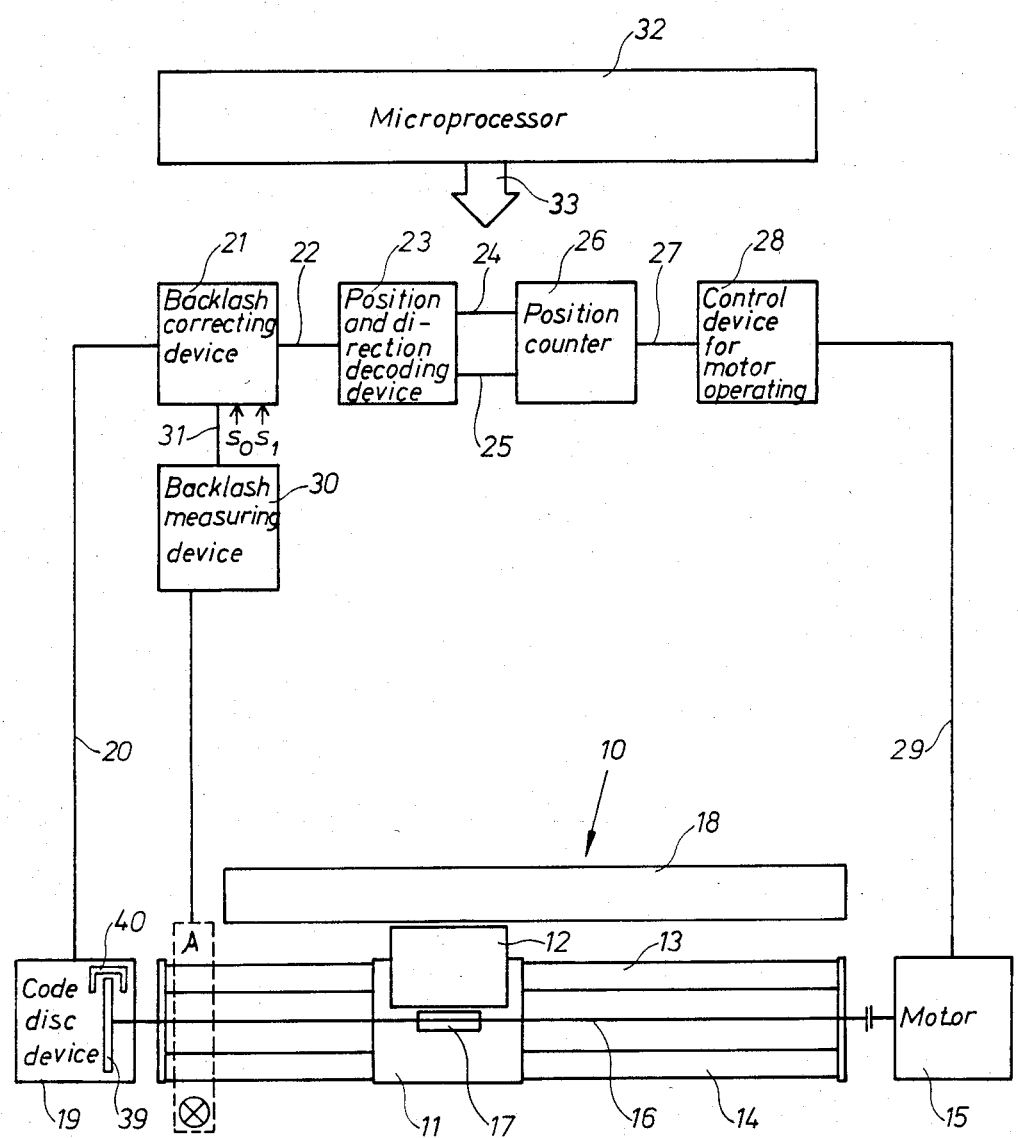
FIG. 1 is a block diagram of a correcting device according to the invention as applied to a printer, shown schematically.

For determining the position of the printing head along a line on the web there is provided an incremental code disc device 19 comprising a code disc 39 rotating with the screw 16 and a photoelectric device 40 co-operating with the code disc. The code disc device emits two pulse trains which are of equal quadrangular shape but being 90° out of phase. Via a line 20 the pulse trains are led to a block 21 comprising a device for correcting of backlash. In the block 21 the pulse trains are modified and subsequently transferred to a block 23 via a line 22. The block 23 comprises a device which out of the pulse trains derives information about the position and direction of movement of the printing head 12. The block 23 has two output terminals which emit signals on conductors 24, 25 to operate a position counter 26 to count up and down, respectively. The position counter is connected to a block 28 via a line 27. The block 28 comprises a control device connected to operate the motor 15 via a line 29. For the guidance of the backlash correcting device in block 21 a value of the backlash between the screw 16 and the nut means 17 must be provided. The backlash value can be measured or produced in some other way. In the example, a block 30 is provided which comprises a backlash measuring device which can be of the kind described in the International patent application No. PCT/SE82/00177. Regularly, the backlash measuring device measures the appearing backlash and stores the measured value which, via a line 31, can be transferred to the backlash correcting device in the block 21. For the overall control of the various activities in the printer 10 a microprocessor is provided which is represented by a block 32, the control function of which being represented by an arrow 33.

Figure 2:
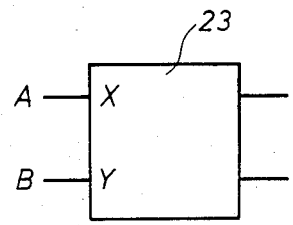
FIG. 2 is a detail view showing the block 23 of FIG. 1.
Figure 2A:
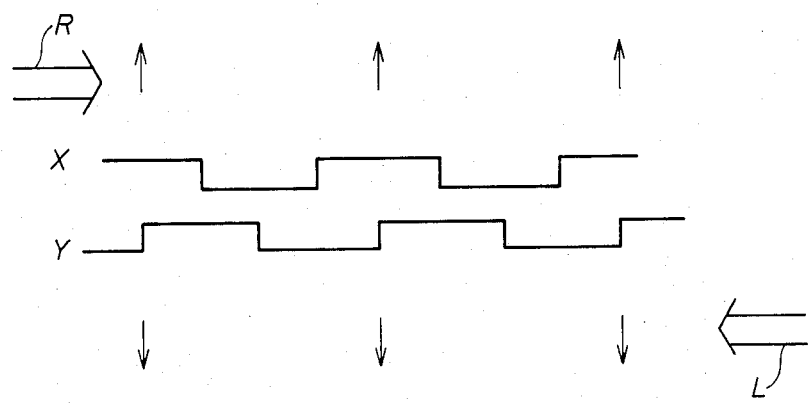
FIG. 2a shows the time diagrams relating to the signal level at two inputs X, Y of the block 23.

FIG. 2 shows the block 23 which comprises a device for decoding as to position and direction of movement the pulse trains A and B generated by the code disc device 19. For the sake of simplicity it is assumed that the two pulse trains have passed the block 21 without being changed. The block 23 has two input terminals X and Y, respectively, to which the pulse trains A and B, respectively, are applied. In FIG. 2a the time diagrams of the signal levels on input terminals X and Y are shown. For the calculation of the position of the carriage 11 during the movement to the right in FIG. 1, the counter 26 is operated to count up by a signal emitted on the conductor 24 each time a positive flank appears on the input Y at the same time as the input X is high. This is illustrated by the upward directed arrows above the time diagram referred to be X in FIG. 2a. As the carriage moves to the left the position counter is correspondingly operated to count down by a signal emitted on the conductor 25 each time a negative flank appears on the input Y at the same time as the input X is high. The points of time at which counting down occurs are indicated by the downward directed arrows below the time diagram referred to by Y. The directions of movement of the carriage are indicated by arrows R and L, respectively. A comparison between the inputs X and Y indicates that counting up and counting down, respectively, of the position counter 26 occurs in the same positions during movement to the right and movement to the left, respectively, which means that the negative effect of the backlash has been eliminated in a simple way.

In the following description of the backlash correcting device, counting up and down, respectively, of the position counter takes place with the periodicity indicated. However, the backlash is compensated in steps which amount to a quarter of the period by relative displacement of the pulse trains in a way which will be described more in detail. The value used for correcting purposes, which could be estimated or measured, of course also has the higher resolution that will be required. For example, in using the measuring device according to the International patent application No. PCT/SE82/00177 referred to above, the pulse trains according to the time diagrams X and Y in FIG. 2a may be combined such that every change in any of the pulse trains generates a pulse which activates the measuring device. Hence, measuring will be performed four times during the period of either of the pulse trains, the measuring times being evenly distributed, i.e. displaced one quarter of the period relative to one another.

Figure 3:
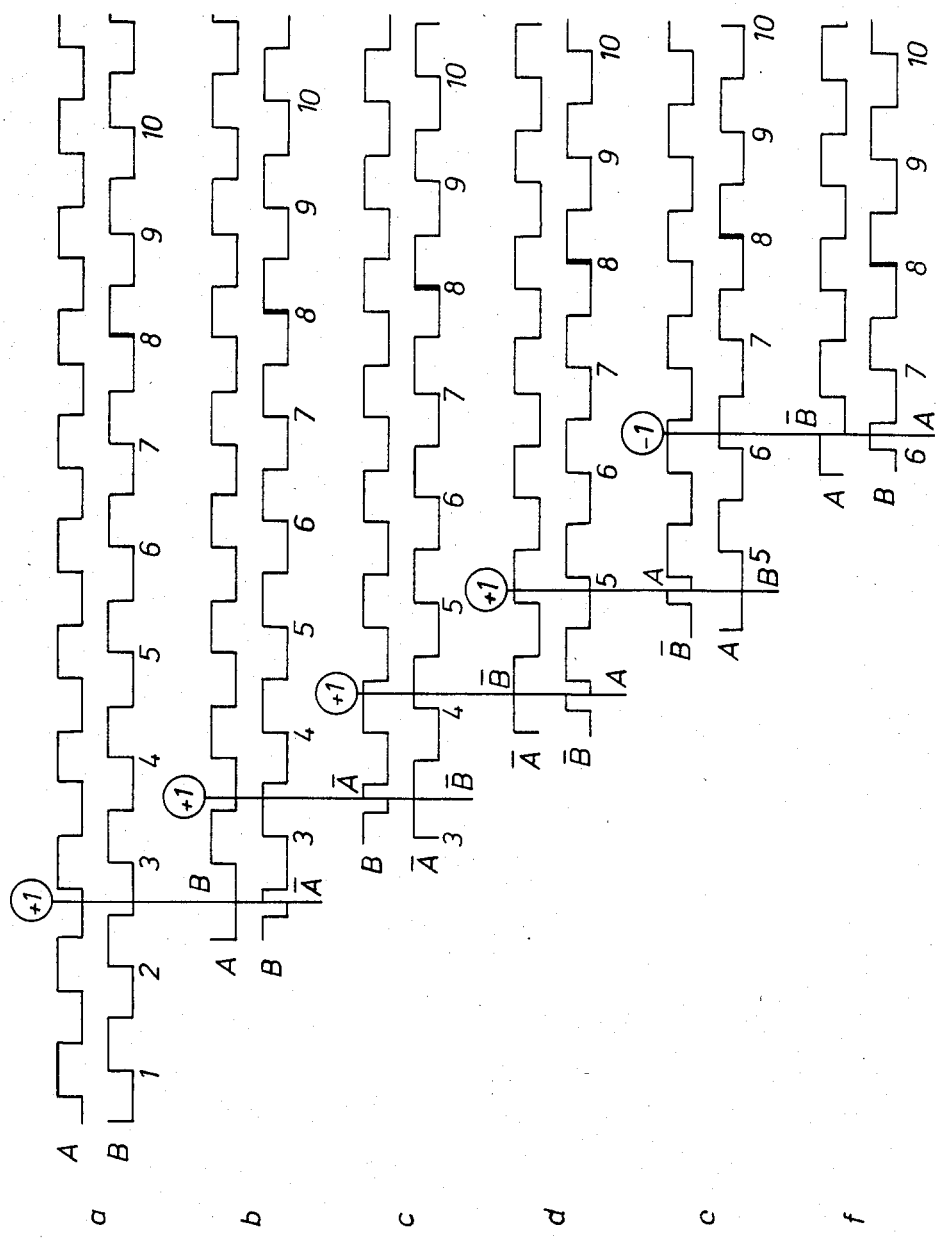
FIG. 3 shows how to combine two pulse trains in order to move a predetermined flank of one of the pulse trains in a selected direction.

With reference to FIG. 3, the theory of the correcting of backlash will now be described. The two pulse trains to be modified in the block 21 have been designated A and B, respectively. These pulse trains can now be combined in four different ways in such an order that every change from one combination to a succeeding one will cause the displacement of one predetermined flank of pulse train B 90° or one quarter of the period. In the uppermost line designated a there are shown pulse trains which arrive in the block 21 from the code disc device 19. The first combination means that the pulse trains remain unchanged and these will become reference pulse trains throughout the following description relating to the order to be chosen for the different combinations in order for a predetermined flank in the pulse train B to be moved first four steps of 90° to the right and then one step to the left. The different combinations are indicated in the lines a–f and in the pulse train B the positive flanks have been numbered 1–10. The flank 8 has been specially marked and the influence on the position of this flank by the different combinations will now be studied.

In order to effect the first displacement of the flank 8 one step of 90°, the pulse trains A and B are to change place and furthermore the pulse train A is to be inverted. This is shown in line b where the pulse trains A and B have been modified accordingly into B and $\overline{A}$. Then, the pulse trains B and $\overline{A}$ are modified, as shown in line c, such that B is inverted and $\overline{A}$ remains unchanged, and moreover the pulse trains change place and hence give the result $\overline{A}$, $\overline{B}$ as outputs from the block 21. In line d the next change is shown, which means that the pulse train $\overline{A}$ is replaced by $\overline{B}$ and the pulse train $\overline{B}$ is replaced by A. The last one of the four steps to the right in FIG. 3 will be obtained according to line e by the pulse train $\overline{B}$ being replaced by A and the pulse train A by B whereupon the order according to line a has been re-established. As a completion, line f shows that modifying of the pulse trains according to line d causes a displacement of the flank 8 one step to the left. By performing the different combinations in the order represented by the lines a–e in a cyclically repeated manner it will be possible to have the flank 8 displaced an arbitrary number of steps of one quarter of the period to the right. The corresponding displacement to the left will be achieved by performing the different combinations in the opposite order. The designation +1 indicates the points of time for the four displacement steps in the positive direction, i.e. to the right. The designation −1 correspondingly indicates the time at which the displacement of one step to the left takes place according to line f.

Figure 4:
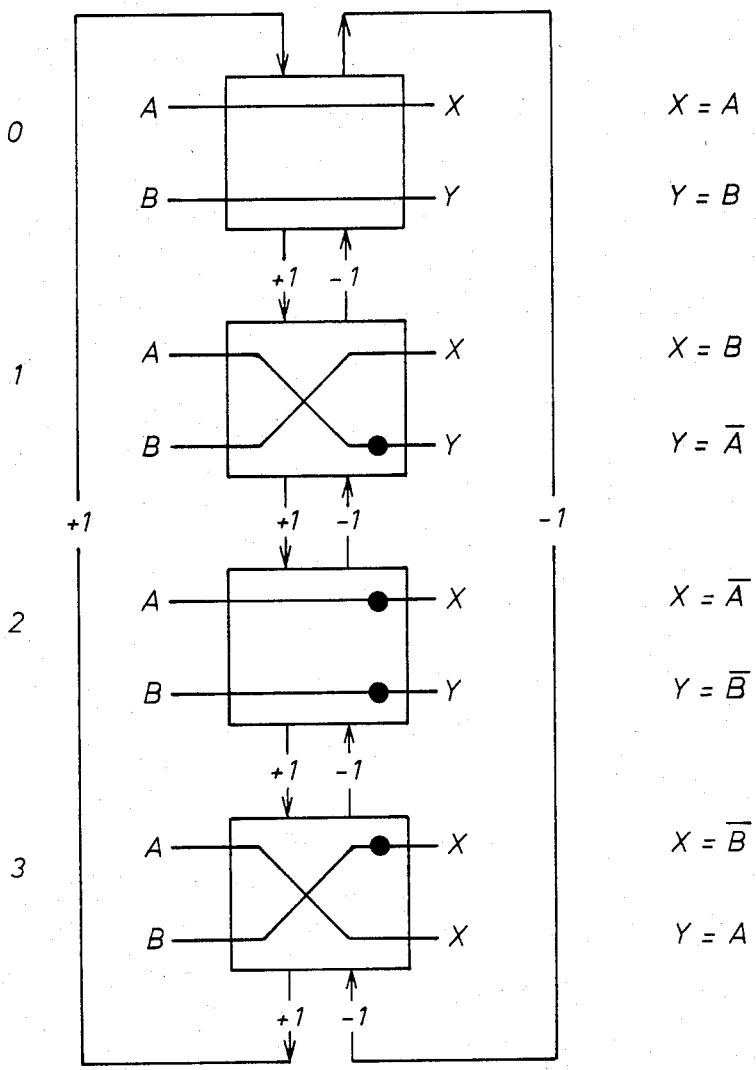
FIG. 4 is a block diagram showing a device for combining the pulse trains according to FIG. 3.

FIG. 4 shows the different circuit variants that in principle will be needed for performing the combinations shown in lines a–d of FIG. 3. Lines a–d correspond to the circuit variants 0–3 in FIG. 4. The two pulse trains being applied to the block 21 are designated A and B as before, whereas the pulse trains transferred to the block 23 from the block 21 are designated X and Y, respectively. Moreover, inversion of any of the pulse trains is indicated by a filled ring.

The circuit variant 0 means that the pulse trains A and B pass the block 21 unchanged and, accordingly, X will be equal to A while Y will be equal to B. In the variant 1, A and B are to change place and A is to be inverted so that X will become B and Y will become $\overline{A}$, compare line b in FIG. 3. The variant 2 means that A and B are to be inverted and, hence, X will become $\overline{A}$ while Y will become $\overline{B}$, see line c in FIG. 3. The circuit variant 3, finally, means that the pulse trains A and B change place and that the pluse train B is inverted so that X becomes $\overline{B}$ while Y becomes A. The arrows designated "+1" indicate the order of the different circuit variants 0–3 in moving an arbitary positive flank in the pulse train B to the right in FIG. 3 in steps of 90° or one quarter of the period. The arrows "−1" indicate correspondingly the order in moving to the left. By $S_0$ and $S_1$ in the block 21 (FIG. 1) those inputs are designated which control the selection of circuit variants. These inputs are connected to the block 32 in a way not indicated.

Figure 5A:
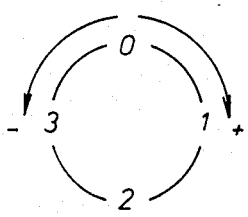
FIGS. 5 and 5a show schematically the order in correcting for backlash in both directions of movement of the movable unit shown in FIG. 1.
Figure 5:
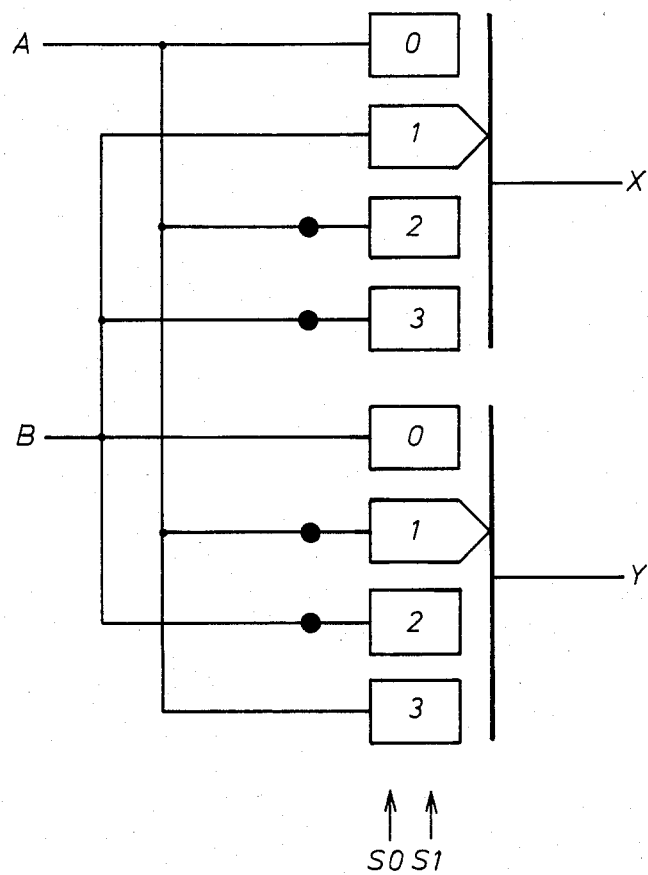

FIG. 5 schematically shows a circuit arrangement for performing the different combinations of the pulse trains A and B. Pairs of rectangles 0,0–3,3 are connected to the inputs A, B to which the corresponding pulse train is applied, either directly or via an inverting circuit represented by a filled circle. The rectangles are arranged in two groups 0–3, 0–3, one of which is connectible to an output X for a correspondingly designated pulse train and the other is connectible to an output Y for a pulse train having the same designation. The circuit arrangement is such that the rectangles of one pair are simultaneously connected to the respective output, so that one rectangle is connected to X whereas the other is connected to Y. In the example shown in FIG. 5, the rectangles 1 are provided with arrows connecting the rectangles to the outputs X and Y, respectively. For example, the arrows can be constituted by movable contacts in a switch.

The order relating to the combinations of FIG. 5 is shown in FIG. 5a, in which clockwise rotation corresponds to positive correction or displacement of the flank 8 to the right in FIG. 3. Anticlockwise rotation corresponds to negative correction or displacement to the left in FIG. 3. The displacement to the right and left, respectively, in FIG. 3 corresponds in the example to a virtual displacement of the carriage 11 and the printing head 12 in opposite directions, i.e. positive correction corresponds to a virtual displacement to the left and vice versa. In order to explain this state of opposition more in detail, reference is also made to lines e and f in FIG. 3 which lines show the negative correction. It is assumed that the carriage has been moved to the right and then stopped. During the movement the position counter 26 (FIG. 1) has been operated to count up to a value corresponding to the position in which the carriage has been stopped. Upon a subsequent movement of the carriage to the left a backlash correction must take place, which means that the position counter is to count up through a number of additional positions which correspond to the backlash. In order to perform the counting up of the position counter, a negative correction must take place, i.e. the flank 8 in FIG. 3 has to be moved to the left. Looking at a point immediately to the left of the position 8 in the lower of the two pulse trains in line e, the pulse counter in this point has counted only the position 7. In line f, negative correction has taken place with one step of one quarter of the period causing the position 8 to be displaced to the left of the point of observation in line e. This means that the position counter now indicates the position 8 and the desired counting up has been performed. In case of a backlash amounting to three steps of one quarter of a period, upon shift in the direction of movement from the right to the left, correction will take place according to the order 0,3,2,1, as seen in FIG. 5a. In the same way shift from the left to the right of the direction of movement will result in a correction according to the order 1,2,3,0. As indicated above, correction will take place in steps of 90° or a quarter of the period while the position counter 26 counts up or down in steps corresponding to one complete period. Even if a correction step will not always influence the position counter, every such step will always be taken into account by the lower of the pulse trains of FIG. 3 being correspondingly displaced relative to the upper pulse train.

Figure 6:
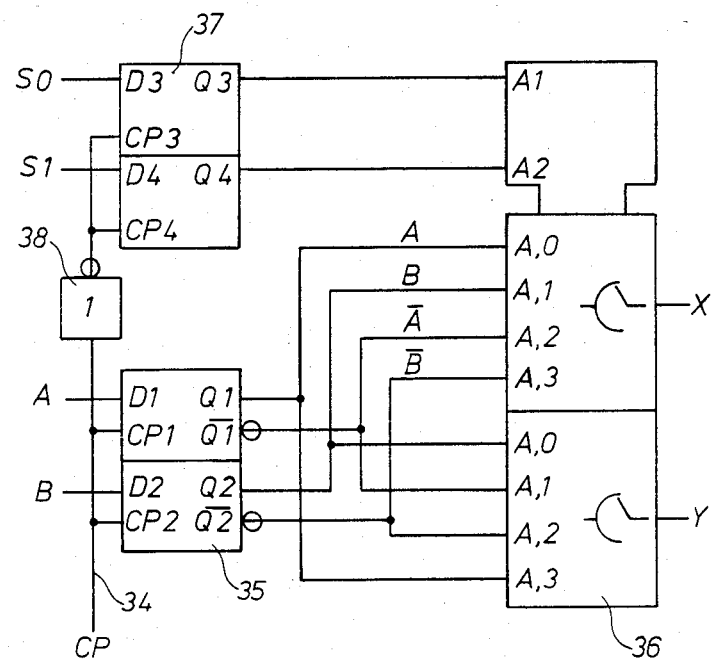
FIG. 6, finally, is a circuit diagram of a useful modifying circuit built up with digital standard TTL-circuits.

In FIG. 6 there is shown an example of how to realize the circuit arrangement of FIG. 5 by the user of four TTL-circuits. In order to avoid correction during the change in any of the pulse trains A and B, the circuit arrangement includes circuits for synchronization by the use of a two-phase clock circuit in a manner well known for those skilled in the art. A clock pulse source, not shown, emits clock pulses on a conductor 34. This conductor is connected to two clock pulse inputs designated $CP_1$, $CP_2$ of a TTL-circuit generally denoted by 35 and being of the type 74109. This circuit comprises two flip-flops each having one non-inverting output $Q_1$, $Q_2$ and one inverting output, $\overline{Q}_1$, $\overline{Q}_2$. The pulse train A appears on the output $Q_1$ and the inverse $\overline{A}$ of this pulse train appears on the output $\overline{Q}_1$. In the same way the pulse train B appears on the output $Q_2$ and the inverse $\overline{B}$ of this pulse train appears on the output $\overline{Q}_2$. The outputs are connected to a TTL-circuit 36 being of the type 74153 and comprising a double selector each having four inputs and one output. One of the selectors connects a selected one of the four inputs to an output X while the other selector connects a selected one of the four inputs to an output Y. All eight inputs of the circuit 36 are connected to the outputs $Q_1$, $\overline{Q}_1$; $Q_2$, $\overline{Q}_2$ of the circuit 35 in accordance with the pattern shown in FIG. 5. Corresponding inputs of the two selectors of the circuit 36 have been given the same designations 0,0–3,3 as used in FIG. 5. However, to the reference numerals the letter A has been added, the letter referring to signal levels at two inputs $A_1$, $A_2$, to which are applied signals $S_0$, $S_1$. The last-mentioned signals determine which of the inputs A,0–A,3 of the respective one of the two selectors in the circuit 36 is to be connected to the output X and the output Y, respectively. In practice, $A_1$, $A_2$ can take the binary values 00, 01, 10, 11, which in the order indicated would correspond to (A,0;A,0), (A,1;A,1), (A,2;A,2), (A,3;A,3). Hence, $A_1$, $A_2$=00 means that the signals at the inputs A,0 are transferred to the outputs X and Y, respectively.

The two-phase clock synchronization indicated above involves the provision of an additional TTL-circuit 37 of the type 74109 to control that the signals $S_0$, $S_1$, determining the shape of the pulse trains at the output X,Y of the circuit 36 will not appear at the inputs $A_1$, $A_2$ of this circuit at the times when the changes take place in the pulse train A or B. The inputs $A_1$, $A_2$ are connected to non-inverting outputs $Q_3$, $Q_4$ which belong to the respective flip-flop of the double circuit 37. The signals $S_0$, $S_1$ are applied to inputs $D_3$, $D_4$ on the respective flip-flop circuit and the clock pulse inputs $CP_3$, $CP_4$ are connected to the conductor 34 via an inverter circuit 38 of the type 7404.

The function of the device of FIG. 6 is the same as described with reference to FIG. 5 and should not need to be further commented. Moreover, for guiding purposes the different combinations of the pulse trains A, B that appear on the inputs of the circuit 36 have been indicated in FIG. 6. The two-phase synchronization entails the inactivation of the clock pulse inputs $CP_3$, $CP_4$ when the clock pulse inputs $CP_1$, $CP_2$ are activated.

I claim:

1. In a device for correcting a backlash arising on a change in the direction of movement of a nut means included in a drive mechanism and co-operating with a power driven screw, the nut means being connected to a unit which is movable back and forth along the screw and having an incremental pulse generating means (19) for generating in synchronism with the movement of the screw first and second pulse trains having the same quadrangular shape but being 90° out of phase, the period of the pulse trains corresponding to the displacement of the movable unit a predetermined distance along the screw, and means for determining the pulse trains from the position and the direction of movement of the movable unit, the improvement comprising means for storing of a value of a value of the backlash with a resolution corresponding to a quarter of the first and second pulse trains and a signal modifying means for combining the first and second pulse trains in four different ways and in a certain order to perform displacement of a predetermined flank of one of the pulse trains as many steps of one quarter of the period as determined by the stored backlash value in a direction determined by the direction of movement of the movable unit that was existing prior to the change of the direction of movement.

2. A device according to claim 1, characterized in that the signal modifying means has two inputs to which the respective pulse train is applied and two outputs at which modified pulse trains appear, the signal modifying means being settable in four different states, the first state being the transfer of the unchanged pulse trains to the respective output, the second state being the inversion of both pulse trains and transfer to the respective output, and the fourth state being the inversion of the lastmentioned pulse train while the first-mentioned one remains unchanged, the respective pulse train being transferred to the opposite output, in case one pulse train is inverted while the other remains unchanged.

3. A device according to claim 2, characterized in that in correcting for backlash upon movement in a predetermined direction along the screw (16) the signal modifying means is operated to take the four states in a cyclically repeated course and in an order according to which on a first and a second output the first and the second pulse train are applied unchanged, on the first output the second pulse train is applied unchanged and on the second output the first pulse train inverted, on the first output the first pulse train is applied inverted and on the second output the second pulse train inverted and on the first output the second pulse train is applied inverted and on the second output the first pulse train unchanged.

4. A device according to claim 3, including by a means for indicating the direction of movement relating to the preceding movement of the movable unit, the signal modifying means being controlled in dependence on the direction indicating means to take the different states in the given or in the opposite succession in order to displace the predetermined flank the number of steps that correspond to the stored value of the backlash.

5. A backlash compensation system for a work piece, linearly moveable in two directions, comprising drive means for causing the work piece to be moved linearly by a drive screw, rotating angle detecting means for producing two rectangular signals A,B, mutually phased displaced by 90° degrees, the number of signals corresponding to the angle through which said drive screw is made to rotate by said drive means, means for determining the position, based on the number of received signals, and moving direction, based on the sign of the angle difference between said signals, of the work piece, means for counting the number of remaining steps to a preset position of the work piece, means for controlling power supplied to said drive means means for generating signals corresponding to the magnitude of said backlash between said screw and said work piece, the improvement comprising signal modifying means for compensation of said backlash when changing moving direction of said work piece by delaying said signals, A,B a time corresponding to the magnitude of said backlash and the rotation speed fo said screw, said signal modifying means comprising means which in a first position transmitting said signal A to a first output X and said signal B to a second output Y, in a second position inverting said signal A and transmitting the inverted signal A to said output Y and transmitting said signal B to said output X, in a third position inverting said signal A and transmitting the inverted signal A to said output X and inverting said signal B and transmitting the inverted signal B to said output Y, and in a fourth position transmitting said signal A to said output Y and inverting said signal B and transmitting the inverted signal B to said output X, thereby delaying said signals A,B, in steps of a fourth of the period time of said signals A,B, the number of said steps controlled by said means for generating signals corresponding to the magnitude of said backlash between said screw and said work piece.

6. A backlash compensation system for a work piece linearly moveable in two directions, comprising drive means for causing the work piece to be moved linearly by a drive screw, rotating angle detecting means for producing two rectangular signals A,B, mutually phased displaced by 90 degrees, the number of signals corresponding to the angle through which said drive screw is made to rotate by said drive means, means for determining the position, based on the number of received signals, and moving direction, based on the sign of the angle difference between said signals, of the work piece, means for counting the number of remaining steps to a preset position of the work piece, means for controlling power supplied to said drive means means for generating signals corresponding to the magnitude of said backlash between said screw and said work piece, the improvement comprising signal modifying means for compensation of said backlash when changing moving direction of said work piece by delaying said signals, A,B a time corresponding to the magnitude of said backlash and the rotation speed of said screw, said signal modifying means comprising means for delaying signals A,B in steps of a fourth of a period time of said signals A,B, the number of said steps controlled by said means for generating signals corresponding to the magnitude of said backlash between said screw and said work piece.

* * * * *